United States Patent
Park

(10) Patent No.: US 10,368,197 B2
(45) Date of Patent: Jul. 30, 2019

(54) METHOD FOR SHARING CONTENT ON THE BASIS OF LOCATION INFORMATION AND SERVER USING THE SAME

(71) Applicants: Chi-Hyung Park, Seoul (KR); DIFT CORPORATION, Seoul (KR)

(72) Inventor: Chi-Hyung Park, Seoul (KR)

(73) Assignees: Chi-Hyung Park, Seoul (KR); DIFT CORPORTAION, Seoul (KR)

(*) Notice: Subject to any disclaimer, the term of this patent is extended or adjusted under 35 U.S.C. 154(b) by 0 days.

(21) Appl. No.: 15/982,943

(22) Filed: May 17, 2018

(65) Prior Publication Data

US 2018/0270613 A1   Sep. 20, 2018

Related U.S. Application Data

(63) Continuation of application No. PCT/KR2016/011363, filed on Oct. 11, 2016.

(30) Foreign Application Priority Data

Nov. 20, 2015 (KR) ........................ 10-2015-0163586

(51) Int. Cl.
*H04W 24/00* (2009.01)
*H04W 4/02* (2018.01)
(Continued)

(52) U.S. Cl.
CPC ........ *H04W 4/023* (2013.01); *G06Q 30/0261* (2013.01); *G06Q 50/01* (2013.01);
(Continued)

(58) Field of Classification Search
CPC ... H04W 4/021; H04W 4/80; H04W 36/0033; H04W 12/02; H04W 4/023; H04W 4/029
See application file for complete search history.

(56) References Cited

U.S. PATENT DOCUMENTS

| 2010/0146583 A1* | 6/2010 | Prehofer | ................ G06Q 10/10 726/1 |
| 2012/0096114 A1* | 4/2012 | Mccolgan | ............... H04L 67/26 709/217 |

(Continued)

FOREIGN PATENT DOCUMENTS

| JP | 2013-115545 A | 6/2013 |
| KR | 10-2013-0049876 A | 5/2013 |

(Continued)

OTHER PUBLICATIONS

International Search Report; issued in PCT/KR2016/011363; dated Jan. 13, 2017.

*Primary Examiner* — Khalid W Shaheed
(74) *Attorney, Agent, or Firm* — Studebaker & Brackett PC

(57) ABSTRACT

The present invention presents a location-based content sharing server enabling content corresponding to a site to be mutually shared, when several users are located in the same site, thereby enabling the users to exchange the same or a similar sensibility about the same content. To this end, the present invention relates to a location-based content sharing method comprising the steps of: (a) acquiring, by the location-based content sharing server, content and location information corresponding thereto; and (b) providing or supporting the provision, by the location-based content sharing server, of the content to a visitor terminal, with reference to a condition of a public-number and a time condition, which are preset in the content in a public area range, when it is sensed that the visitor terminal has entered the public area range according to the location information.

26 Claims, 9 Drawing Sheets

(51) Int. Cl.
*H04W 88/18* (2009.01)
*G06Q 50/00* (2012.01)
*H04L 29/08* (2006.01)
*G06Q 30/02* (2012.01)

(52) U.S. Cl.
CPC .............. *H04L 67/18* (2013.01); *H04L 67/26* (2013.01); *H04W 4/02* (2013.01); *H04W 88/18* (2013.01)

(56) References Cited

U.S. PATENT DOCUMENTS

| | | |
|---|---|---|
| 2014/0172571 A1 | 6/2014 | Fabrikant et al. |
| 2015/0095214 A1* | 4/2015 | Ahn ..................... G06Q 20/227 705/39 |
| 2015/0319119 A1* | 11/2015 | Ryu ........................ H04L 51/10 715/752 |
| 2016/0205238 A1* | 7/2016 | Abramson ......... G01C 21/3484 455/456.4 |

FOREIGN PATENT DOCUMENTS

| | | |
|---|---|---|
| KR | 10-2013-0089847 A | 8/2013 |
| KR | 10-2014-0079611 A | 6/2014 |

* cited by examiner

METHOD FOR SHARING CONTENT ON THE BASIS OF LOCATION INFORMATION AND SERVER USING THE SAME

CROSS-REFERENCE TO RELATED APPLICATIONS

The present application is a continuation of International Patent Application No. PCT/KR2016/011363, filed Oct. 11, 2016, which is based upon and claims the benefit of priority to Korean Patent Application No. 10-2015-0163586, filed on Nov. 20, 2015. The disclosures of the above-listed applications are hereby incorporated by reference herein in their entirety.

BACKGROUND

Embodiments of the inventive concept described herein relate to a method and a server for providing contents, and more particularly, relate to a location-based content sharing method and a location-based content sharing server that allow contents to be shared with a visitor in an area associated with the contents, such that a person who provides the contents and the visitor feel empathy while feeling the same realism at the same location.

Currently, various types of social network services including Facebook, Twitter, and the like are being provided. Such social network services are spreading around the world based on the service feature that enables a user to share information with unspecified individuals if they have a common interest, as well as his acquaintances.

However, there may be discrimination in accepting information according to the situation or position of each party sharing information shared in the social network. When the image photographed by the camera of a portable terminal is shared between a plurality of followers, the information that the followers feel by seeing the image is different from that by directly seeing it in the field. This is because that the sense of presence is excluded from the shared information.

For example, a user may feel resting when seeing rural scenery, while he/she may feel primitivity when seeing an image corresponding to the rural scenery. There may be a user who feel the grandeur and ages of the buildings while traveling in Egypt and looking at the pyramids, while he may only see the pyramid shown in an image as a past triangular structure.

That is, the relationship between information and emotion has a feature that it is difficult to feel the same emotion unless the sense of presence is shared.

Thus, there has been disclosed a system for providing contents to each area in Japanese Publication Patent No. 2013-115545 (hereinafter referred to as "R1"), where the system has a content providing server for each region and each content providing server provides regional information to a portable terminal located in the corresponding region. In addition, there has been disclosed an invention entitled "SELECTING CONTENT ITEMS BASED ON GEOPOSITIONING SAMPLES" in US Patent Application Publication No. 2014-0172571 (hereafter referred to as "R2"), where contents located on a moving route are provided to a user's device based on the location movement path of a device. In addition, there has been disclosed an on-line message marketing method based on a user location information network service using a web and a smart phone, in Korean Patent Publication No. 2013-0089847 (hereinafter referred to as "R3"), where, when a business office registers a point of interest (POI) including a coupon or an advertisement on a web server, the POI is provided only to a user located near the business office to allow the user to receive and use it.

In the case of R1, contents are provided from each regional server to a mobile terminal located within a given range, but this does not cause information exchange or emotional exchange between users. In the case of R2, the content is provided in accordance with the moving route of a user, and only the contents optimized for one user is provided. However, the user cannot exchange emotion or information with other users. In the case of R3, it is only to provide a coupon or an advertisement to a user located in the vicinity, but the R3 cannot induce information or emotion to be exchanged between users.

SUMMARY

Embodiments of the inventive concept provide a location-based content sharing method and a location-based content sharing server for solving at least one of the above problems.

The technical objects of the inventive concept are not limited to the above-mentioned ones, and the other unmentioned technical objects will become apparent to those skilled in the art from the following description.

In accordance with an aspect of the inventive concept, there is a method of sharing contents based on a location, the method comprising (a) acquiring, by a location-based content sharing server, contents and location information corresponding to the contents, and (b) when it is sensed based on the location information that a visitor terminal enters a public area range, providing the contents to the visitor terminal or supporting the providing of the contents to the visitor terminal by the location-based content sharing server with reference to a condition of a public number and a time condition which are preset in the public area range, wherein, in the operation (b), the location-based content sharing server provides a hint message about the contents to the visitor terminal when i) the visitor terminal is closed to the location-based content sharing server by a preset distance in the public area range, or ii) a creator of the contents is located within a predetermined range in a residential area of a visitor or is an alumnus or a colleague with the visitor.

In accordance with another aspect of the inventive concept, there is provided a method of sharing contents based on a location, the method comprising (a) acquiring, by a location-based content sharing server, (i) contents and location information corresponding to the contents and (ii) setting a public area range for the contents with reference to the location information, (b) acquiring, by the location-based content sharing server, a reputation score given to the contents, and (c) when it is sensed based on the location information that a visitor terminal enters the public area range, providing the contents to the visitor terminal or supporting the providing of the contents to the visitor terminal by the location-based content sharing server with reference to the reputation score, wherein, in the operation (c), the location-based content sharing server provides a hint message about the contents to the visitor terminal when i) the visitor terminal is closed to the location-based content sharing server by a preset distance in the public area range, or ii) a creator of the contents is located within a predetermined range in a residential area of a visitor or is an alumnus or a colleague with the visitor.

In accordance with another aspect of the inventive concept, there is a location-based content sharing server comprising a communication unit configured to acquire contents and location information corresponding to the contents from a terminal or another server connected to a network, and a processor configured to provide the contents to a visitor terminal or supporting the providing of the contents to the visitor terminal with reference to a condition of a public number of contents and a time condition corresponding to the contents which are preset corresponding to the contents when it is sensed based on the location information that the visitor terminal enters a public area range, wherein the processor provides a hint message about the contents to the visitor terminal when i) the visitor terminal is closed to the location-based content sharing server by a preset distance in the public area range, or ii) a creator of the contents is located within a predetermined range in a residential area of a visitor or is an alumnus or a colleague with the visitor.

In accordance with another aspect of the inventive concept, there is a location-based content sharing server comprising a communication unit configured to acquire contents and location information corresponding to the contents from a terminal or another server connected to a network, and a processor configured to set a public area range for the contents with reference to the location information, calculate a reputation score given to the contents, and provide the contents to a visitor terminal or supporting the providing of the contents to the visitor terminal with reference to the reputation score when it is sensed based on the location information that the visitor terminal enters the public area range, wherein the processor supports a hint message about the contents to the visitor terminal when the visitor terminal is closed to the location-based content sharing server by a preset distance in the public area range, or a creator of the contents is located within a predetermined range in a residential area of a visitor or is an alumnus or a colleague with the visitor.

The other detailed items of the inventive concept are described and illustrated in the specification and the drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
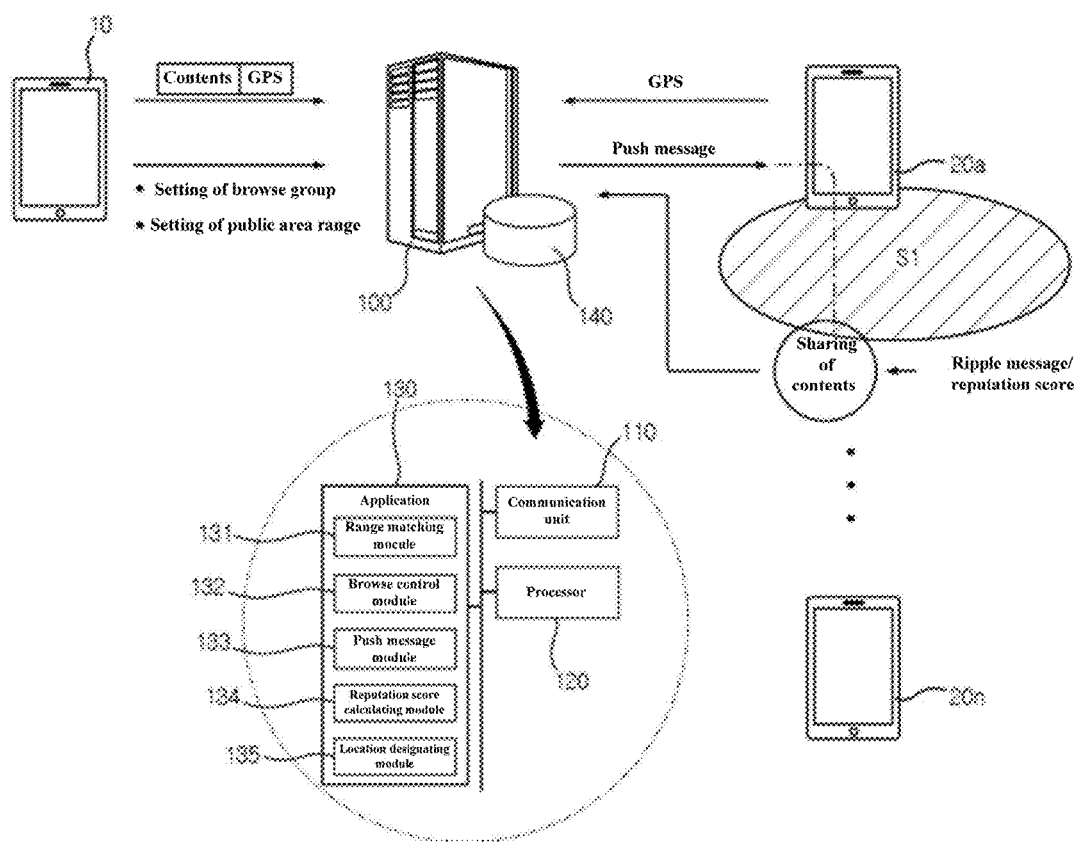
FIG. 1 is a conceptual diagram illustrating a location-based content sharing server according to an embodiment.

The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept are provided to make the disclosure of the inventive concept complete and fully inform those skilled in the art to which the inventive concept pertains of the scope of the inventive concept.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements. Throughout the specification, the same reference numerals dente the same elements, and "and/or" includes the respective elements and all combinations of the elements. Although "first", "second" and the like are used to describe various elements, the elements are not limited by the terms. The terms are used simply to distinguish one element from other elements. Accordingly, it is apparent that a first element mentioned in the following may be a second element without departing from the spirit of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The portable terminal referred to in the present disclosure may be a smart phone, a tablet PC, a laptop computer, or a wearable device such as a smart watch or a Google Glass. In addition, the portable terminal may include a processor, a display device, a camera, and a wireless communication device, and may mean various types of devices that a user can use while carrying it. However, for convenience of explanation and understanding of the present disclosure, the description will be given mainly on a smartphone in the present disclosure.

The term "visitor portable terminal" referred to in the present disclosure may refer to a portable terminal of a person who uses contents registered in a location-based content sharing server. In the present disclosure, a party receiving contents is referred to as a visitor portable terminal and a party providing contents is referred to as a portable terminal, which will be described separately.

Hereinafter, exemplary embodiments of the inventive concept will be described in detail with reference to the accompanying drawings.

Figure 2:
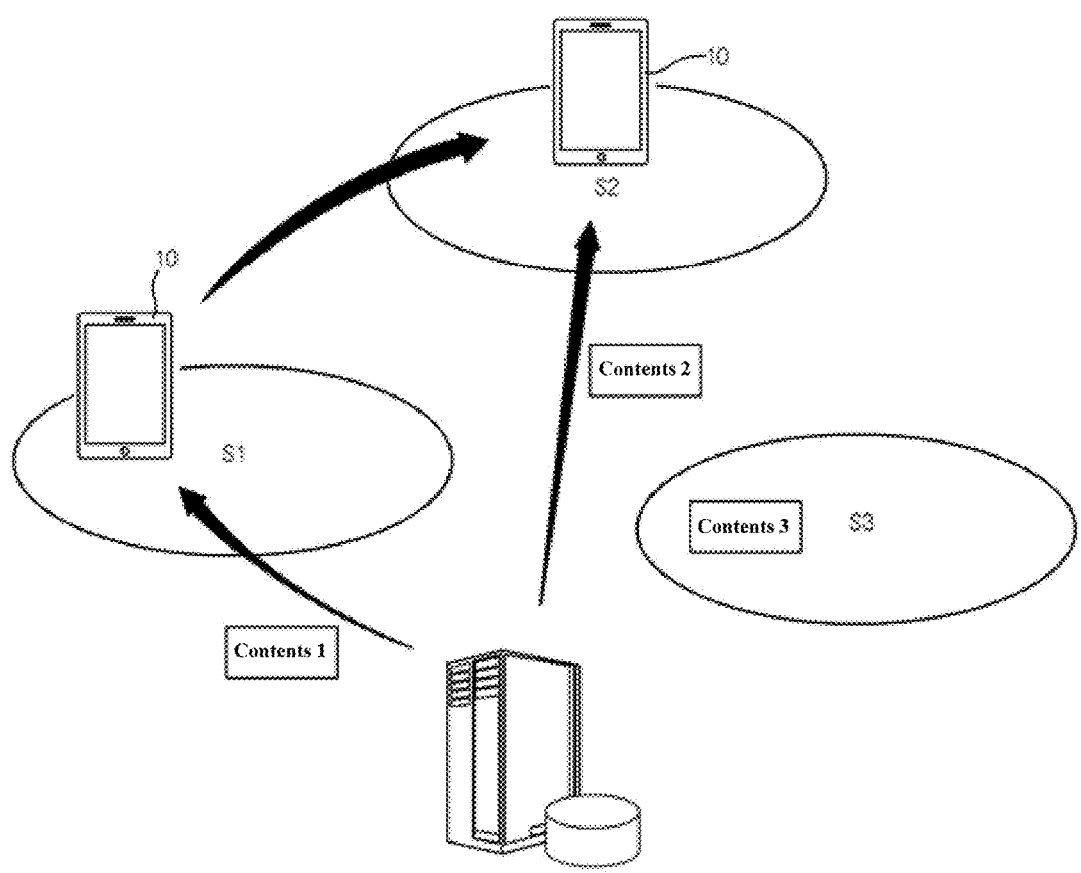
FIG. 2 is a conceptual diagram illustrating a scheme of providing contents from a location-based content sharing server to a portable terminal of a visitor located in a public area according to an embodiment.
Figure 3:
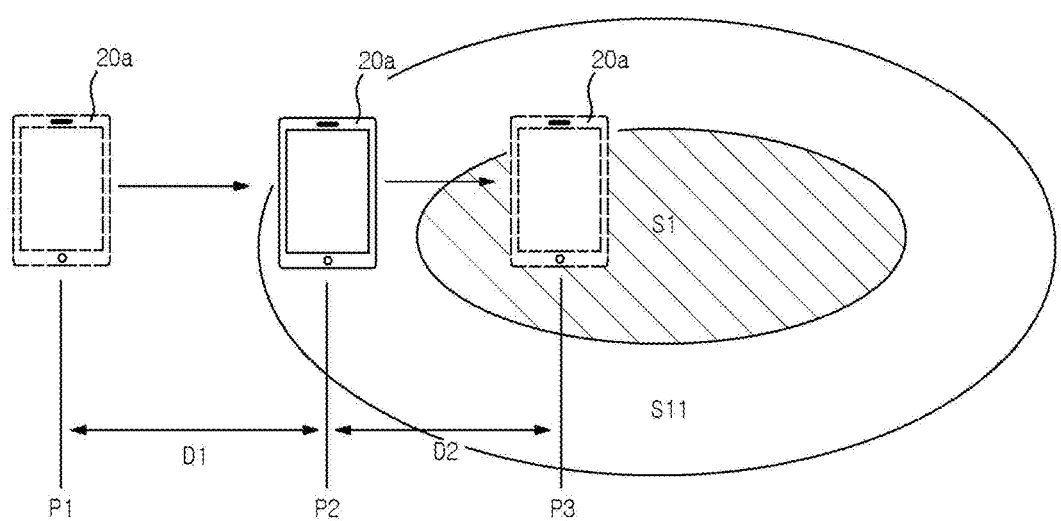
FIG. 3 is a conceptual diagram illustrating a scheme of providing contents with a time lag by a location-based content sharing server according to an embodiment.
Figure 4:
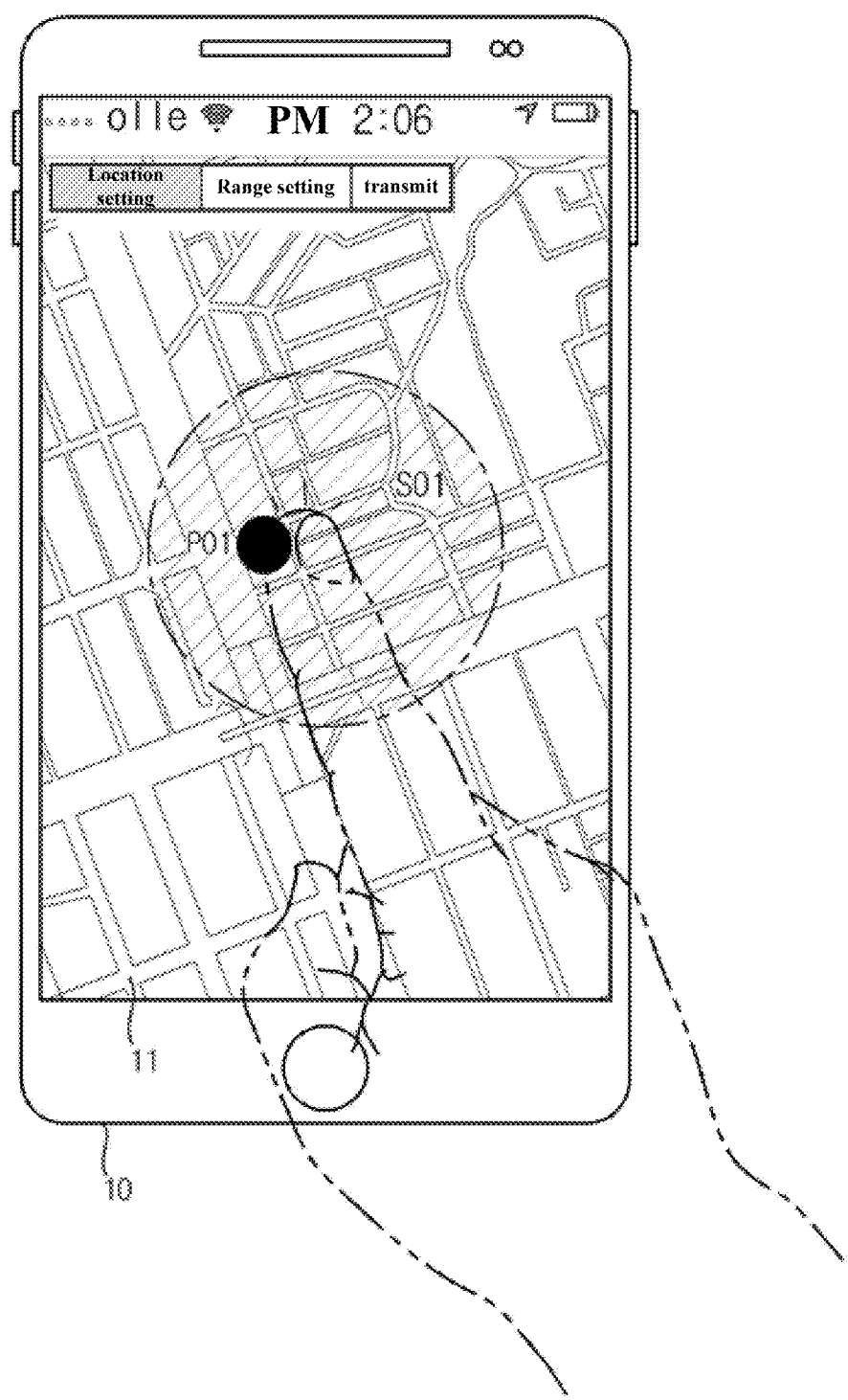
FIGS. 4 and 5 are reference views illustrating an example of a method of setting a public area range.
Figure 5:
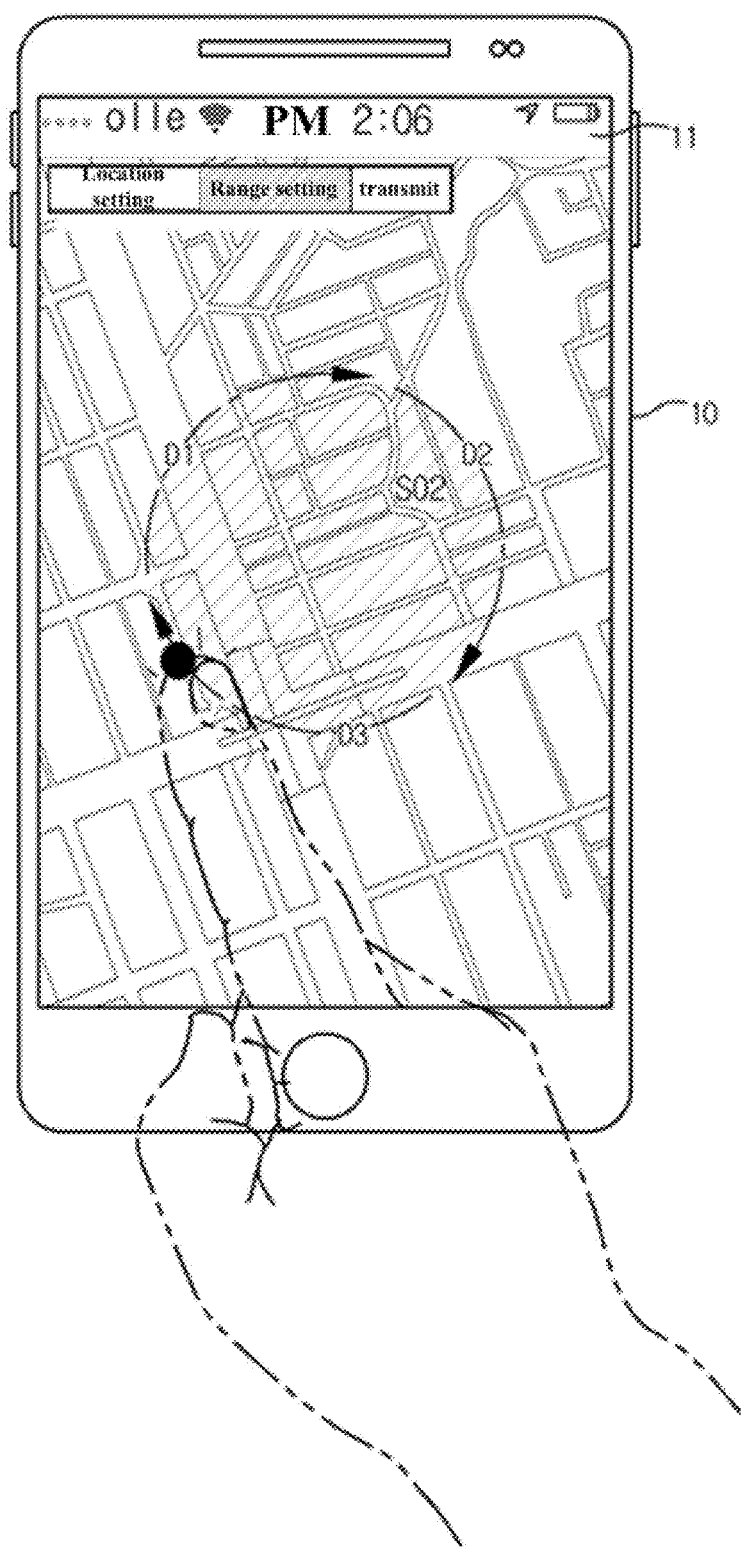

FIG. 1 is a conceptual diagram illustrating a location-based content sharing server according to an embodiment. FIG. 2 is a conceptual diagram illustrating a scheme of providing contents from a location-based content sharing server to a portable terminal of a visitor located in a public area according to an embodiment. FIG. 3 is a conceptual diagram illustrating a scheme of providing contents with a time lag by a location-based content sharing server according to an embodiment. FIGS. 4 and 5 are reference views illustrating an example of a method of setting a public area range.

Referring to FIGS. 1 to 5, a location-based content sharing server 100 according to an embodiment may acquire contents, location information (GPS location information), a public area range, and browsing-group setting information from a portable terminal 10 connected to a wireless network.

A GPS positioning scheme for acquiring GPS location information directly from a GPS satellite and a network-based positioning scheme may be used for the location information.

In the network-based scheme, a plurality of terminals transmitting and receiving beacons, Wi-Fi, Blue-tooth, RFID, and ultrasonic waves may be installed in a predetermined space, and the location of the portable terminal 10 may be measured with reference to the communication coverages, radio wave transmission/reception strengths, or radio wave reception angles of the terminals.

The network-based scheme is basically based on triangulation. In order to precisely measure the location of the portable terminal 10 using the terminal corresponding to a reference point, it is preferable that the communication distance between the terminal corresponding to the reference point and the portable terminal 10 is short and the number of reference points is large. This is the reason why the communication scheme currently referred to in the network-based scheme is a short-range wireless communication scheme.

The location-based content sharing server 100 may combine contents provided from the portable terminal 10 with information about a location at which the portable terminal 10 generates the contents, and the location information combined with the contents may be used as one key. The location information may not simply indicate the generation location of the contents, but be used as one key indicating an area where the contents are opened. Even if the users of the visitor portable terminals 20a to 20n use the same social network service as the user of the portable terminal 10 and information is shared with each other, when the visitor portable terminals 20a to 20n are not located in the public area range designated by the key, the location-based content sharing server 100 according to an embodiment does not provide contents to the visitor portable terminals 20a to 20n. This is because the location-based content sharing server 100 according to an embodiment can share information and sensitivity.

Meanwhile, the location information combined with contents may be GPS location information, which is expressed in point coordinates, and does not indicate a range of an area. Thus, when the visitor portable terminals 20a to 20n are located close to a location according to the location information, to provide contents to the visitor portable terminals 20a to 20n, there is a need to convert the point location information into a form of range information (a public area range). A scheme of converting location information into range information (a public area range) is performed by applying the following operations of:

1) Setting a public area range S1 by forming a circle around position information;

2) Setting the public area range S1 to a Korean administrative district, such as Ci, Gun, Dong, Eup, or Li, including the location information;

3) Forming one area group by grouping a plurality of administrative districts based on location information; and 4) Directly setting the public area range S01 through a touch input by a user on a touch screen 11 provided on the portable terminal 10.

In the case of scheme 1), the public area range S1 may be set in the form of a radius of 100 m, 500 m, 1 Km, or 3 Km based on the location information, and may be automatically set by the location-based content sharing server 100 or be set by the user of the portable terminal 10.

Meanwhile, as illustrated in FIG. 4, when a user directly touches a desired point P01 in the electronic map displayed on the touch screen 11 of the portable terminal 10 side and the location-based content sharing server 100 is notified of the coordinate information of the point P01, the location-based content sharing server 100 may set the public area range S01 by forming a circle having a radius of 100 m, 500 m, 1 Km or 3 Km around the point P01.

In the case of scheme 3), the areas designated by scheme 1) or 2) are grouped into one based on a common feature. For example, when it is assumed that three administrative districts A1, A2 and A3 in units of township hold the event "Taean mud festival", the three administrative districts related to the event "Taean mud festival" are grouped into one local group. When the visitor portable terminals 20a to 20n are located in the corresponding local group, contents may be provided to the visitor portable terminals 20a to 20n. For example, although the location information of the contents is generated in the administrative district A1, the location-based content sharing server 100 may provide the contents to the visitor portable terminals 20a to 20n even when the visitor portable terminals 20a to 20n are located in the administrative district A3.

In the case of scheme 4), an electronic map is displayed on the touch screen 11 provided in the portable terminal 10 and the public area range is directly set by applying a touch input into a certain range through the touch input of a user on 6the displayed electronic map. As illustrated in FIG. 5, in the state that the user touches one area P01 with reference to the electronic map displayed on the touch screen 11 provided in the portable terminal 10, the user may directly set the public area range by dragging his finger in the direction of D1-D2-D3 while drawing an arc.

When the location-based content sharing server 100 provides the contents to the visitor portable terminals 20a to 20n, the location-based content sharing server 100 transmits a push message to the visitor portable terminals 20a to 20n, thereby providing the contents to the visitor portable terminals 20a to 20n.

The visitor portable terminals 20a to 20n may directly access the contents by touching the received push message or may inquire the contents after accessing the social network service with reference to the push message.

Thereafter, after accessing the contents, the visitor portable terminals 20a to 20n may leave a ripple message about the contents, or return a reputation score based on satisfaction in the contents. In this case, when there are a plurality of visitor portable terminals 20a to 20n located in the public area range S1, only the visitor portable terminals 20a to 20n located in the public area range S1 may share the contents with each other and leave ripple messages or give reputation scores.

Meanwhile when the vicinity of the public area range S1 is a communication shadow area S11, it may be difficult for the visitor portable terminals 20a to 20n to receive the contents. When the visitor portable terminals 20a to 20n enter the public area range S1 through the communication shadow area S11, the location-based content sharing server 100 according to an embodiment may provide the contents to the visitor portable terminals 20a to 20n with reference to the movement tendencies of the visitor portable terminals 20a to 20n. In this case, the contents can be opened after a predetermined time has elapsed after being provided to the visitor portable terminals 20a to 20n. This will be described in detail with reference to FIG. 3.

Referring to FIG. 3, when it is assumed that the visitor portable terminal 20a moves from point P1 toward point P3 via point P2, the location-based content sharing server 100 may calculate the time required for the visitor portable terminal 20a to move from point P1 to point P2 and the moving speed, and may infer the time required to move from point P2 to point P3 from the calculated speed.

When the distance between points P1 and P2 is D1 and the distance D1 is divided by the time required to travel D1, the speed at which the visitor portable terminal 20a moves from point P1 to point P2 may be calculated, such that the speed "ts" at which the visitor portable terminal 20a moves from point P2 to point P3 may be calculated based on the speed. Thus, in the case that the visitor portable terminal 20a passes through the communication shadow area S11, the location-based content sharing server 100 may provide the contents to the visitor portable terminal 20a in advance when the visitor portable terminal 20a moves from point P1 to point P2, where the time at which the contents are displayed on the visitor portable terminal 20a after the time "ts" is elapsed may be set.

Meanwhile, the location-based content sharing server 100, which provides the contents to the visitor portable terminal 20a in advance, may allow the visitor portable terminal 20a to display the contents for a predetermined time period, and automatically destroy the contents when the predetermined time is elapsed. As described above, when the time for the contents is set, it may be possible to access the contents only when the user of the visitor portable terminal 20a is interested in the contents.

Until now, the contents have matched the visitor portable terminals 20a to 20n in connection with the location information generated from the user terminal 10. However, even if the location where the contents are generated is not necessarily in the corresponding area, a situation may occur in which the contents for the corresponding area are generated and used. For example, a person located in a specific area (e.g., S1 area) may hold a meeting or gathering, the contents previously generated in a specific area (e.g., area S1) may be uploaded to the location-based content sharing server 100 in another area, or the contents may be generated for a specific area (e.g., area S1) in another area.

In this case, the generation location of the contents generated from the user terminal 10 is required to be changed by the user. This will be described in detail with reference to FIGS. 3 and 4.

As illustrated in FIG. 3, after the electronic map is displayed on the touch screen 11 provided in the portable terminal 10, a user may touch an arbitrary point P1 to determine the generation location of the contents. When the user touches the point P01 on the electronic map, the location-based content sharing server 100 may acquire location information about the location selected by the user from the portable terminal 10, and then, the location-based content sharing server 100 may form a circle based on the location information about the location selected by the user to set the formed circle as the public area range.

Meanwhile, the user may directly set the public area range through the portable terminal 10. As illustrated in FIG. 4, when the user touches one point P02 and drags in the direction of D1-D2-D3 in the touch state after the electronic map is displayed on the touch screen 11 of the portable terminal 10, the inner periphery of the circle defined by P02-D1-D2-D3 may be set as the public area range. In FIG. 4, the public area range corresponds to "S02".

In addition, the user may set a diameter of the public area range in accordance with the time of touching the electronic map displayed on the touch screen 11 of the portable terminal 10.

For example, in FIG. 4, a size of the public area range S01 displayed on the touch screen 11 may be gradually increased as the time for which the user presses one point P01 of the portable terminal 10 is increased. In this case, the size of the public area range S01 is determined by the time for which the touch input is applied at an arbitrary point on the touch screen 11.

Meanwhile, in FIG. 4, the size of the public area range S01 may be determined by the touch pressure applied by the user to the touch screen 11.

For example, in FIG. 4, when the touch pressure applied by the user to the touch screen 11 is weak, the size of the public area range S01 displayed on the touch screen 11 may be small. To the contrary, when the touch pressure is strong, the size of the public area range S01 may be displayed to be large.

The location-based content sharing server 100 may provide the contents to the visitor portable terminals 20a to 20n corresponding to the location set by the user (or in the public area range) without regard to the location (or the public area range) at which the contents is first generated, or may request another server (such as a content server, a media server, a web server, a search server, or the like) to provide the contents to the visitor portable terminals 20a to 20n.

Preferably, the location-based content sharing server 100 may include a processor 120 and a communication unit 110. The location-based content sharing server 100 may include a range matching module 131, a browse control module 132, a reputation score calculating module 134, a location designating module 135, and a database 140 which are applications driven by the processor 120.

The communication unit 110 may provide wired/wireless network environment and may acquire contents and location information corresponding to the contents from the portable terminal 10 connected to a wireless network or another content server (not shown) connected to a wired network. In this case, another content server (not shown) connected to the communication unit 110 through the wired network may include various types of servers such as a content server, a web server, a search server, and the like. The communication unit 110 may obtain contents including location information from such servers and may provide the contents to the processor 120.

The processor 120 may implement various functions by driving an application 130. The functions of the applications driven by the processor 120 will be described below one by one.

The range matching module 131 matches contents to location information (GPS location information) when the contents are transmitted from the portable terminal 10 to the location-based content sharing server 100 according to an embodiment. The range matching module 131 may set the public area range S1 in accordance with setting by the user of the portable terminal 10, or match the public area range S1 based on a preset reference in the location-based content sharing server 100. In this case, the matching between location information and public area information may be based on the schemes of 1) to 3) described above. Thereafter, when the public area range S1 is matched, the range matching module 131 stores the matching result, that is, the result of matching the contents and the public area range S1 in the database 140.

The browse control module 132 may obtain location information (GPS location information) of the portable terminal 10 and the visitor portable terminals 20a to 20n from each of the portable terminal 10 and the visitor portable terminals 20a to 20n using the location-based content sharing server 100, and may determine whether the locations of the visitor portable terminals 20a to 20n correspond to the public area range S1 set in the contents. As a determination result, when the visitor portable terminal (at least one of the visitor portable terminals 20a to 20n) corresponding to the public area range S1 set in the contents is found, the browse control module 132 may transmit a push message for inquiring the contents to the visitor portable terminal (at least one of the visitor portable terminals 20a to 20n) corresponding to the public area range S1. The push message may be used to directly connect the visitor portable terminals 20a to 20n to the contents, or recommend for the visitor portable terminals 20a to 20n to access the contents.

In addition, the browse control module 132 may refer to the GPS location information of the visitor portable terminals 20a to 20n provided from the communication unit 110. When the visitor portable terminals 20a to 20n are located near the communication shadow area, the browse control module 132 may transmit the push message in advance, may apply a time limit to the contents such that the contents is kept to be valid in the visitor portable terminals 20a to 20n only for a predetermined time, or may be automatically deleted after the predetermined time.

In addition, the browse control module 132 may limit the number of browsing times per unit time (e.g., one day, one week, one month, one year, or the like) for the contents, and may use the content as a limited edition.

When the contents are set as a limited edition, even if the visitor portable terminals 20a to 20n continuously enter the public area range S1, the contents may be provided in order of arrival. When the number of times that the contents are provided exceeds the limited number, subsequent visitors may not receive the contents. In this state, when the visitor portable terminals 20a to 20n desire to browse the contents exceeding the limited number, the visitor portable terminals 20a to 20n may deposit the fee for browsing restriction in the browse control module 132, or may pay cyber money such as On-line Pay distributed in the on-line space.

The browse control module 132 may transmit the contents while setting a time limit on the contents in accordance with the location of the portable terminal (at least one of the portable terminals 20a to 20n) or may generate a push message to automatically destroy the contents within a time limit.

The reputation score calculating module 134 may acquire information about reputation scores which the visitor portable terminals 20a to 20n give to each of the contents while the visitor portable terminals 20a to 20n access each of the contents and store the information about the reputation score for each of the contents in the database 140. After accessing the contents, the visitor portable terminals 20a to 20n may provide the reputation scores given to items such as importance, emotional empathy, emotional transmissibility of contents, and the like to the reputation score calculating module 134.

When the reputation score given to the contents is finally calculated by the reputation score calculating module 134, the calculated reputation score may be used as follows.

The processor 120 compares a reference score set in the visitor portable terminals 20a to 20n with the reputation score. As the comparison result, when the reputation score is equal to or lower than the reference score, the processor 120 does not guide or provide the contents to the visitor portable terminals 20a to 20n.

The visitor portable terminals 20a to 20n may provide a reputation score of how much emotion is shared by viewing the contents in the public area range S1 in which the contents is allowed to be accessed, how much the contents are appropriate in the public area range S1, or how much importance corresponds to the corresponding public area range, such that the reputation score calculating module 134 digitizes the reputation score and stores it in the database 140. Then, the user of the portable terminal 10 may inquire about the evaluations of his contents by the users of the visitor portable terminals 20a to 20n.

When the user of the portable terminal 10 sets an arbitrary location or a public area range for contents, the location designating module 135 may change the providing range of the contents to a user-set location or a public area range in response to the setting. The location designating module 135 may provide an electronic map to the user terminal 10 and obtain information about the location or public area range set through the touching or dragging of the user on the electronic map, from the user terminal 10. To this end, the location designating module 135 may provide an app to the portable terminal 10, and the provided app may have the following functions of:

5) performing network communication with the location-based content sharing server 100, 6) acquiring an electronic map from the location-based content sharing server 100 and displaying the electronic map on the touch screen 11, 7) displaying a menu for changing the location or the public area range, a transmission menu, a menu related to an electronic map request on one area of the touch screen, and 8) acquiring a touch or drag input of a user on an electronic map and providing the touch or drag input to the location-based content sharing server 100.

FIGS. 6 to 9 are views illustrating an example of an social network service displayed on a portable terminal.

Figure 6:
FIGS. 6 to 9 are views illustrating an example of an interface displayed on a portable terminal.
Figure 7:
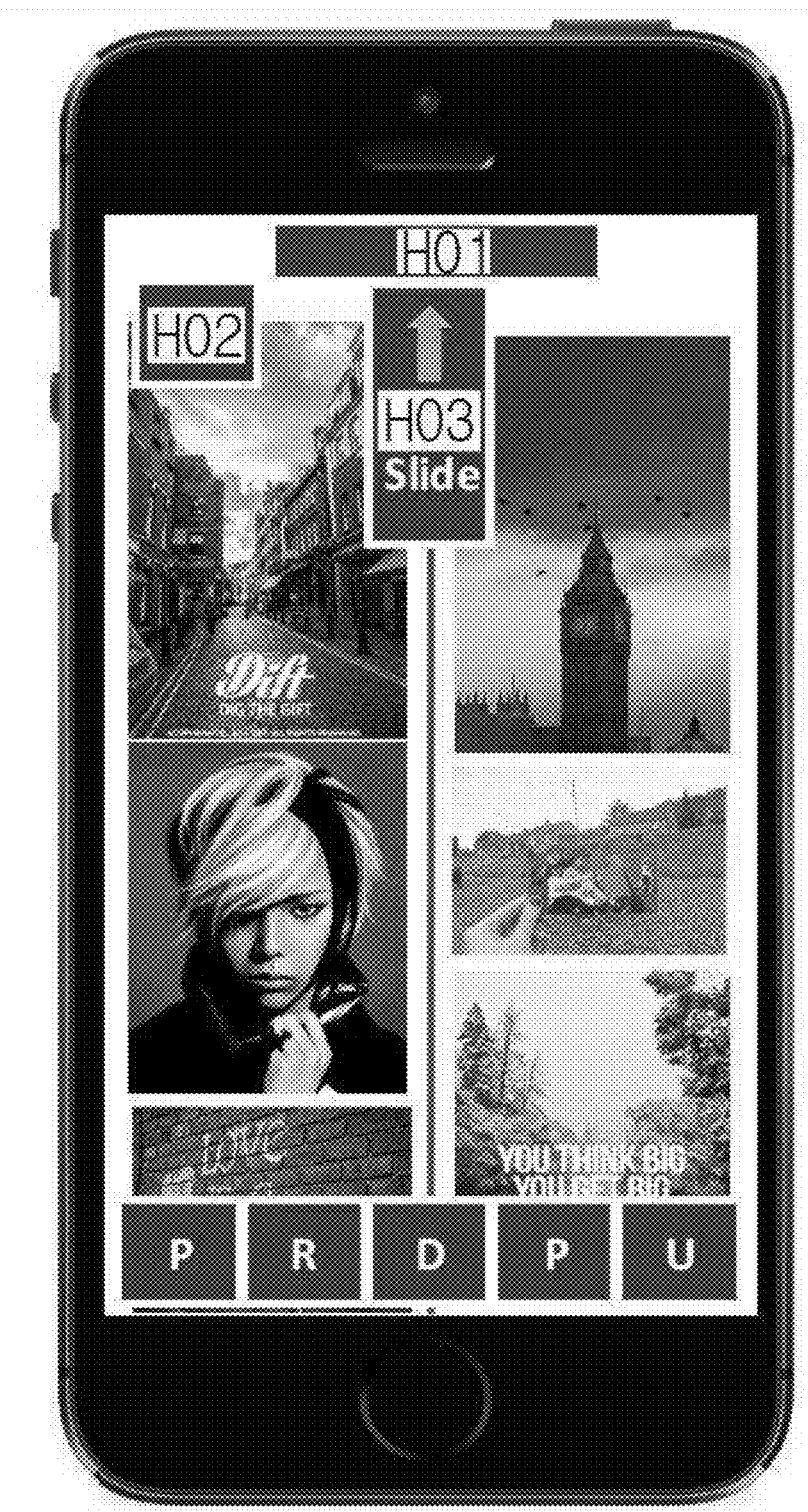

First, FIG. 6 illustrates an image of a main interface connected to the location-based content sharing server 100. Item 1 on the lower left side of FIG. 6 represents a "public menu" for providing an open view, item 2 represents an "event reception menu" for accessing an event received from the location-based content sharing server 100, item 3 represents a dimension shift (DIFT) menu for moving horizontally and vertically the screen, item 4 represents an event menu for accessing an event item applied by the user of the portable terminal 10, and item "5" represents an environment setting menu for setting a personal profile, a follower, or an environment. In this case, when the public menu of item 1 is selected by the user, as shown in FIG. 7, the public interface image may be displayed on the portable terminal 10. Referring to FIG. 7, it can be seen that a plurality of images are listed on the public interface image, where a photograph or a moving picture may be displayed on the screen in a thumbnail image format, and enlarged when the user selects it. The public interface image shown in FIG. 7 may be contents that the user of the portable terminal 10 or the users of the visitor portable terminals 20a to 20n discloses without specifying any disclosure objects. When the user of the portable terminal 10 or the users of the visitor portable terminals 20a to 20n does not designate a specific person or a specific group, the contents to be disclosed may be expressed in the form shown in FIG. 7.

Figure 8:

Next, FIG. 8 illustrates an example of an interface displayed on the screen when the users of the visitor portable terminals 20a to 20n select one of the contents shown in FIG. 7. In FIG. 7, when the item "1" is selected, a back menu is executed. When the item "2" is selected, the preference for the contents is given. When the item "3" is selected, the profile information of the user of the portable terminal 10 which has uploaded the contents is displayed on the screen. The item "4" represents a reporting menu for defective contents. The item "5" represents a scheme of moving up and down an image on the screen.

Figure 9:
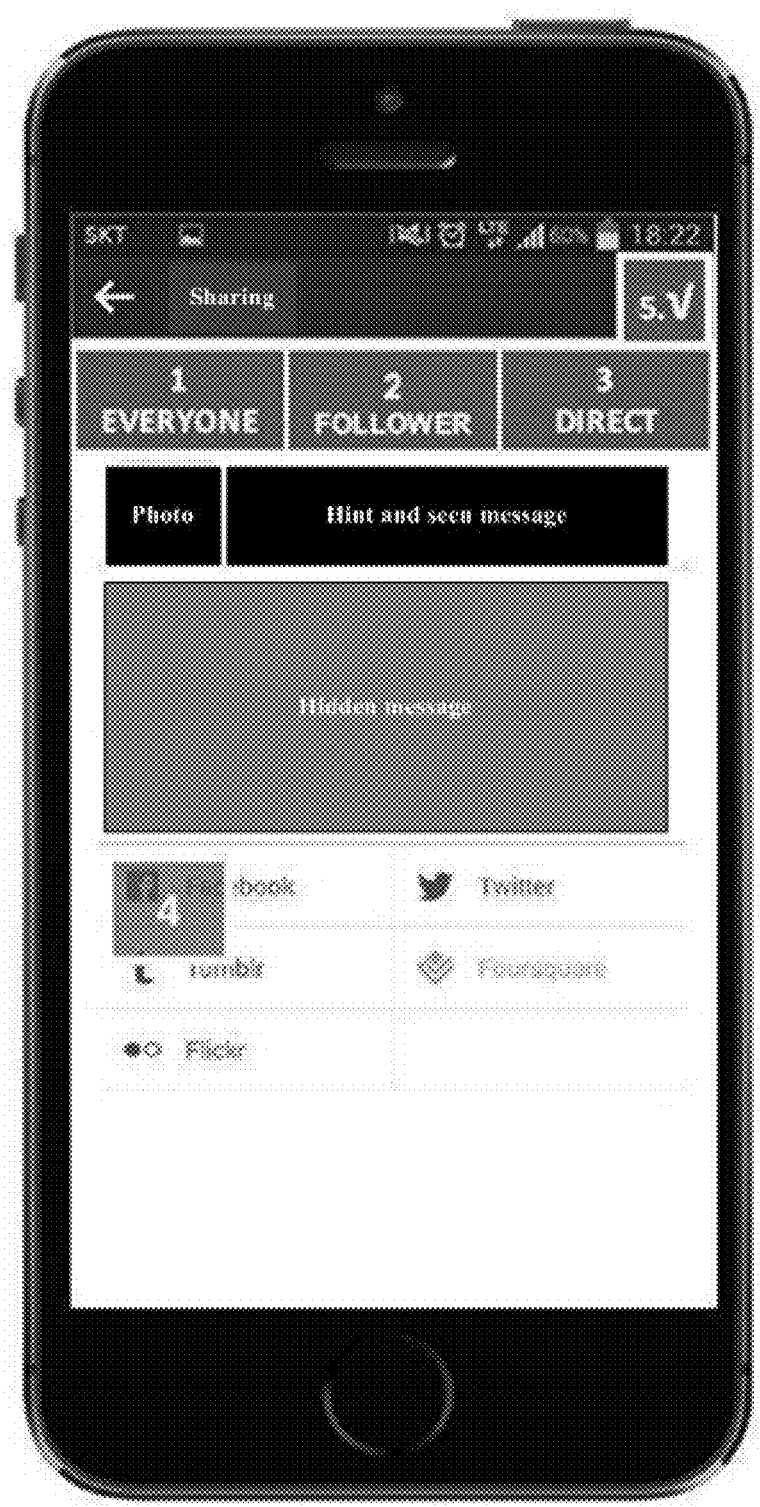

FIG. 9 illustrates an example of a setting menu for user-setting contents in a portable terminal. In FIG. 9, item "1" represents a menu for publicly disclosing contents, item "2" represents a menu for disclosing contents to followers, item "3" represents a menu for disclosing contents only to a user designated by the user of the portable terminal 10, item "4" represents a menu for linking an event for contents to another social network service, and item "5" represents a confirmation menu for confirming and ending the sharing setting in FIG. 9.

The setting menu of FIG. 9 indicates that the user of the portable terminal 10 can set a content use range. As described above, the contents may be disclosed in accordance with the user range set by the user of the portable terminal 10, and in addition, the contents may be shared with the users of the social network service in accordance with the public area range set therein. Therefore, the contents may be accessed and used by a user in an appropriate range within the public area range, so that users share the sense of presence beyond simple content access, thereby emotionally sharing contents.

In some embodiments, the above-discussed method of FIGS. 2 to 9, according to this disclosure, is implemented in the form of program being readable through a variety of computer means and be recorded in any non-transitory computer-readable medium. Here, this medium, in some embodiments, contains, alone or in combination, program instructions, data files, data structures, and the like. These program instructions recorded in the medium are, in some embodiments, specially designed and constructed for this disclosure or known to persons in the field of computer software. For example, the medium includes hardware devices specially configured to store and execute program instructions, including magnetic media such as a hard disk, a floppy disk and a magnetic tape, optical media such as CD-ROM (Compact Disk Read Only Memory) and DVD (Digital Video Disk), magneto-optical media such as floptical disk, ROM, RAM (Random Access Memory), and flash memory. Program instructions include, in some embodiments, machine language codes made by a compiler and high-level language codes executable in a computer using an interpreter or the like. These hardware devices are, in some embodiments, configured to operating as one or more of software to perform the operation of this disclosure, and vice versa.

A computer program (also known as a program, software, software application, script, or code) for the above-discussed method of FIGS. 2 to 9 according to this disclosure is, in some embodiments, written in a programming language, including compiled or interpreted languages, or declarative or procedural languages. A computer program includes, in some embodiments, a unit suitable for use in a computing environment, including as a stand-alone program, a module, a component, or a subroutine. A computer program is or is not, in some embodiments, correspond to a file in a file system. A program is, in some embodiments, stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program is, in some embodiments, deployed to be executed on one or more computer processors located locally at one site or distributed across multiple remote sites and interconnected by a communication network.

According to the embodiments, when a plurality of users are located in the same field, contents corresponding to the field may be shared between the users, so that the same or similar emotions for the same contents are exchanged between the users.

Although the exemplary embodiments of the inventive concept have been described with reference to the accompanying drawings, it will be understood by those skilled in the art to which the inventive concept pertains that the inventive concept can be carried out in other detailed forms without changing the technical spirits and essential features thereof. Therefore, the above-described embodiments are exemplary in all aspects, and should be construed not to be restrictive.

What is claimed is:

1. A method of sharing contents based on a location, the method comprising:
   (a) acquiring, by a location-based content sharing server, contents and location information corresponding to the contents; and
   (b) when sensing, based on the location information, that a visitor terminal enters a public area range, providing the contents to the visitor terminal or supporting the providing of the contents to the visitor terminal by the location-based content sharing server based on a determination whether a public number condition regarding a maximum number of distributing the contents is met and a determination whether a time condition regarding a maximum time period for distributing the contents is met, the public number condition and the time condition are preset with respect to the public area range,
   wherein, in the operation (b), the location-based content sharing server
      determines whether a first condition that a distance between the visitor terminal and the location-based content sharing server in the public area range is shorter than a preset distance is met,
      determines whether a second condition that a creator of the contents is located within a predetermined range in a residential area of a visitor or is an alumnus or a colleague with the visitor is met, and
      provides a hint message about the contents to the visitor terminal based on a determination that at least one of the first and second conditions is met.

2. The method of claim 1, wherein, in the operation (b), the public area range is one of an area set by a radius user-set based on the location information of the contents, an administrative area corresponding to the location information, and a divided region corresponding to the positional information among divided areas into which an electronic map is divided.

3. The method of claim 1, wherein the condition of the public number in the operation (b) is user-set through a provider terminal that provides the contents to the location-based content sharing server, and is a limited number of the contents distributed in the public area range.

4. The method of claim 3, wherein, in the operation (b), after exceeding the limited number of the contents, the visitor terminal entering the public area range accesses the contents after paying for browsing the contents to the location-based content sharing server.

5. The method of claim 1, wherein in the operation (b), the time condition is a time-limited condition that is provided only for a preset time when the visitor terminal matches the public area range.

6. The method of claim 1, wherein, in the operation (b), the location-based content sharing server enables the contents and a ripple message for the contents to be shared between a plurality of visitor terminals located in the public area range.

7. The method of claim 1, wherein, in the operation (b), the location-based content sharing server provides the contents to the visitor terminal in advance before the visitor terminal reaches the public area range and sets a time for visitor terminal to inquire the contents after a preset time when the visitor terminal is located in a communication shadow area.

8. The method of claim 1, wherein, in the operation (a), the location information is user-set through a portable terminal which uploads the contents.

9. The method of claim 8, wherein the operation (a) includes:
   i) supporting an electronic map to be displayed on the portable terminal; and
   ii) acquiring an area set by a user on the electronic map as the public area range.

10. A method of sharing contents based on a location, the method comprising:
   (a) acquiring, by a location-based content sharing server, (i) contents and location information corresponding to the contents and (ii) setting a public area range for the contents with reference to the location information;
   (b) acquiring, by the location-based content sharing server, a reputation score given to the contents; and
   (c) when it is sensed based on the location information that a visitor terminal enters the public area range, providing the contents to the visitor terminal or supporting the providing of the contents to the visitor terminal by the location-based content sharing server with reference to the reputation score,
   wherein, in the operation (c), the location-based content sharing server provides a hint message about the contents to the visitor terminal when i) a distance between the visitor terminal and the location-based content sharing server in the public area range is shorter than a preset distance, or when ii) a creator of the contents is located within a predetermined range in a residential area of a visitor or is an alumnus or a colleague with the visitor.

11. The method of claim 10, wherein, in the operation (a), the public area range is one of an area set by a radius user-set based on the location information of the contents, an administrative area including the location information, and a divided region corresponding to the positional information among divided areas into which an electronic map is divided.

12. The method of claim 10, wherein, in the operation (b), when a score is given to the contents or a ripple message for the contents shared by the visitor terminal in the public area range on at least one of content importance, emotional empathy, and emotional transmissibility, the location-based content sharing server calculates the reputation score for the contents with reference to the ripple message.

13. The method of claim 10, wherein, in the operation (c), the location-based content sharing server blocks the contents from being transmitted to the visitor terminal when the reputation score is less than or equal to a reference score, with reference to the reference score user-set through the visitor terminal.

14. A location-based content sharing server comprising:
   a communication unit configured to acquire contents and location information corresponding to the contents from a terminal or another server connected to a network; and
   a processor configured to, when sensing, based on the location information, that a visitor terminal enters a public area range, provide the contents to the visitor terminal or support providing of the contents to the visitor terminal, based on a determination whether a public number condition regarding a maximum number of distributing the contents is met and a determination whether a time condition regarding a maximum time period for distributing the contents is met, the public number condition and the time condition are preset with respect to the public area range,
   wherein the processor
      determines whether a first condition that a distance between the visitor terminal and the location-based content sharing server in the public area range is shorter than a preset distance is met,
      determines whether a second condition that a creator of the contents is located within a predetermined range in a residential area of a visitor or is an alumnus or a colleague with the visitor is met, and
      provides a hint message about the contents to the visitor terminal based on a determination that at least one of the first and second conditions is met.

15. The server of claim 14, wherein the public area range is one of an area set by a radius user-set based on the location information of the contents, an administrative area including the location information, and a divided region corresponding to the positional information among divided areas into which an electronic map is divided.

16. The server of claim 14, wherein the condition of the number of the contents is user-set through a provider terminal that provides the contents to the location-based content sharing server, and is a limited number of the contents distributed in the public area range.

17. The server of claim 16, wherein, after exceeding the limited number, the visitor terminal entering the public area range accesses the contents after paying for browsing the contents to the location-based content sharing server.

18. The server of claim 14, wherein the contents are time-limited contents that are provided only for a preset time when the visitor terminal matches the public area range.

19. The server of claim 14, wherein the processor enables the contents and a ripple message for the contents to be shared between a plurality of visitor terminals located in the public area range.

20. The server of claim 14, wherein the processor provides the contents to the visitor terminal in advance before the visitor terminal reaches the public area range and sets a time for visitor terminal to inquire the contents after a preset time when the visitor terminal is located in a communication shadow area.

21. The server of claim 14, wherein the location information is user-set through a portable terminal which uploads the contents.

22. The server of claim 14, wherein the processor performs operations of:
   i) supporting an electronic map to be displayed on the portable terminal uploading the contents; and
   ii) acquiring an area set by a user on the electronic map as the public area range.

23. A location-based content sharing server comprising:
   a communication unit configured to acquire contents and location information corresponding to the contents from a terminal or another server connected to a network; and
   a processor configured to set a public area range for the contents with reference to the location information, calculate a reputation score given to the contents, and provide the contents to a visitor terminal or supporting the providing of the contents to the visitor terminal with reference to the reputation score when it is sensed based on the location information that the visitor terminal enters the public area range, wherein the processor supports a hint message about the contents to the visitor terminal when a distance between the visitor terminal and the location-based content sharing server in the public area range is shorter than a preset distance, or when a creator of the contents is located within a predetermined range in a residential area of a visitor or is an alumnus or a colleague with the visitor.

24. The location-based content sharing server of claim 23, wherein the public area range is one of an area set by a radius user-set based on the location information of the contents, an administrative area including the location information, and a divided region corresponding to the positional information among divided areas into which an electronic map is divided.

25. The location-based content sharing server of claim 23, wherein, when a score is given to the contents or a ripple message for the contents shared by the visitor terminal in the public area range on at least one of content importance, emotional empathy, and emotional transmissibility, the processor calculates the reputation score for the contents with reference to the score.

26. The location-based content sharing server of claim 25, wherein the processor blocks the contents from being transmitted to the visitor terminal when the reputation score is less than or equal to a reference score, with reference to the reference score user-set through the visitor terminal.

* * * * *